United States Patent
Muramatsu et al.

(10) Patent No.: US 11,231,433 B2
(45) Date of Patent: Jan. 25, 2022

(54) AUTOMATIC ANALYZER AND CLEANING METHOD

(71) Applicant: HITACHI HIGH-TECHNOLOGIES CORPORATION, Tokyo (JP)

(72) Inventors: Yoshiki Muramatsu, Tokyo (JP); Akihiro Yasui, Tokyo (JP); Yoshihiro Suzuki, Tokyo (JP); Yoichi Aruga, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 467 days.

(21) Appl. No.: 16/078,063

(22) PCT Filed: Jan. 31, 2017

(86) PCT No.: PCT/JP2017/003475
§ 371 (c)(1),
(2) Date: Aug. 21, 2018

(87) PCT Pub. No.: WO2017/145672
PCT Pub. Date: Aug. 31, 2017

(65) Prior Publication Data
US 2019/0049477 A1 Feb. 14, 2019

(30) Foreign Application Priority Data
Feb. 24, 2016 (JP) .............................. JP2016-033090

(51) Int. Cl.
*B08B 3/04* (2006.01)
*G01N 35/10* (2006.01)
(Continued)

(52) U.S. Cl.
CPC .......... *G01N 35/1004* (2013.01); *B01L 13/02* (2019.08); *B08B 3/022* (2013.01);
(Continued)

(58) Field of Classification Search
CPC .... G01N 35/1004; G01N 35/10; B08B 3/022; B08B 9/00; B08B 3/04; B08B 5/02;
(Continued)

(56) References Cited

U.S. PATENT DOCUMENTS

| 2008/0099057 A1* | 5/2008 | Dunfee | G01N 35/1004 134/94.1 |
| 2009/0041622 A1* | 2/2009 | Maeda | G01N 35/1004 422/63 |

(Continued)

FOREIGN PATENT DOCUMENTS

| EP | 2 025 418 A1 | 2/2009 |
| JP | 62-242858 A | 10/1987 |

(Continued)

OTHER PUBLICATIONS

International Preliminary Report on Patentability received in corresponding International Application No. PCT/JP2017/003475 dated Sep. 7, 2018.

(Continued)

*Primary Examiner* — Alexander Markoff
(74) *Attorney, Agent, or Firm* — Mattingly & Malur, PC

(57) ABSTRACT

The invention provides a highly reliable automatic analyzer and dispenser probe cleaning method that allows for the removal of leftover cleaning water from the outer wall surfaces of a probe without increasing the size of a cleaning bath and contaminating the outer wall surfaces of the probe. A cleaning bath 113 (108, 106) comprises: a cleaning water outlet 203 for discharging into the cleaning bath 113 (108, 116) the cleaning water supplied from a cleaning water supply mechanism 123; and a compressed air outlet 204, disposed on the trajectory of the cleaning water discharged from the cleaning water outlet 203, for discharging the compressed air supplied from a compressed air supply (Continued)

mechanism 124 toward a sample probe 111*b* or a reagent probe 120 inserted in the cleaning bath 113 (108, 106).

11 Claims, 11 Drawing Sheets

(51) Int. Cl.
*B08B 9/02* (2006.01)
*B08B 7/04* (2006.01)
*B08B 3/02* (2006.01)
*B08B 9/00* (2006.01)
*B08B 5/02* (2006.01)
*B01L 3/02* (2006.01)

(52) U.S. Cl.
CPC .................. *B08B 3/04* (2013.01); *B08B 5/02* (2013.01); *B08B 7/04* (2013.01); *B08B 9/00* (2013.01); *B08B 9/021* (2013.01); *G01N 35/10* (2013.01); *B01L 3/021* (2013.01); *B08B 2209/032* (2013.01)

(58) Field of Classification Search
CPC ..... B08B 7/04; B08B 9/021; B08B 2209/032; B01L 13/02; B01L 3/021
See application file for complete search history.

(56) References Cited

U.S. PATENT DOCUMENTS

2009/0217951 A1* 9/2009 Ngo .................. G01N 35/1004 134/22.12
2012/0227771 A1* 9/2012 Waterbury ......... G01N 35/1004 134/36
2014/0377132 A1* 12/2014 Shimase ............ G01N 35/1004 422/67
2015/0204895 A1* 7/2015 Yasui ................. G01N 35/1004 422/64
2015/0346231 A1* 12/2015 Mori .................. G01N 35/1004 422/67
2016/0069922 A1* 3/2016 Horiuchi ........... G01N 35/1004 250/431
2016/0263626 A1* 9/2016 Schopman ............. B08B 3/022
2016/0334432 A1* 11/2016 Miyazaki ............... G01N 21/75
2016/0363604 A1* 12/2016 Yasui ..................... G01N 35/04
2018/0128847 A1* 5/2018 Yasui ................. G01N 35/1004

FOREIGN PATENT DOCUMENTS

| JP | 2002-340913 A | 11/2002 | |
| JP | 2005-241442 A | 9/2005 | |
| JP | 2011-78881 A | 4/2011 | |
| JP | 2013-134142 A | 7/2013 | |
| JP | 2014-085285 A | 5/2014 | |
| WO | WO-2015065183 A1 * | 5/2015 | ............. B08B 3/024 |

OTHER PUBLICATIONS

Extended European Search Report received in corresponding European Application No. 17756114.9 dated Sep. 23, 2019.
International Search Report of PCT/JP2017/003475 dated Mar. 14, 2017.

* cited by examiner

AUTOMATIC ANALYZER AND CLEANING METHOD

TECHNICAL FIELD

The present invention relates to an automatic analyzer that analyzes a liquid sample such as a reagent, blood and urine, and a method for cleaning a probe.

BACKGROUND ART

With an aim of being capable of drying a nozzle in a short time without scattering cleaning water to the outside and conducting highly precise evaluation with a high throughput, in Patent Literature 1, an automatic analyzer is disclosed which includes a cleaning bath for a nozzle, a compressor for supplying compressed air, and a cleaning water supply mechanism for supplying cleaning water, in which the cleaning bath includes an upper opening to which the nozzle gains access for cleaning, a lower opening for draining the cleaning water, a cleaning water injection port for injecting the cleaning water to the nozzle, and a compressed air injection port for removing leftover cleaning water remaining in the nozzle.

CITATION LIST

Patent Literature

Patent Literature 1: Japanese Unexamined Patent Application Publication No. 2013-134142

SUMMARY OF INVENTION

Technical Problem

With respect to the automatic analyzer, there exist various apparatuses according to the use application, and a biochemical automatic analyzer is one of them. The biochemical automatic analyzer analyzes the component of a sample by dispensing a biological sample (hereinafter referred to as "sample") such as blood serum and urine and a reagent to a reaction vessel by a pipetting mechanism such as a probe and optically measuring variation of the color tone and the turbidity generated during a reaction inside the reaction vessel using a photometric unit such as a spectrophotometer. Therefore, with respect to the automatic analyzer, a cleaning bath is provided in which the inner wall and the outer wall of the probe are cleaned by cleaning water after suctioning and discharging a reagent or an examined sample.

With respect to an automatic analyzer according to a related art, the probe is used repeatedly by cleaning the inner wall and the outer wall of the probe that has conducted dispensing in the cleaning bath. However, the cleaning water is possibly left over on the outer wall surface of the probe after cleaning. There was a concern that this leftover cleaning water thinned the concentration of the sample and the reagent for the next dispensing and deteriorated the analysis accuracy. In the past, because the impact of variation in the concentration of the sample, reagent, and the like caused by bringing in the cleaning water left over on the outer wall surface of the probe on the measurement result was small, the cleaning water left over on the outer wall surface of the probe was not removed and was used as it was.

In recent years, because reduction in the dispensing volume has been in progress, the impact of variation in the concentration of the sample, reagent, and the like caused by bringing in the cleaning water on the measurement result has become larger. Also, in such apparatus that suction from a same vessel and cleaning of a probe are repeated by several hundreds of times for example, the impact on the measurement result comes to appear extremely.

Therefore, methods for removing the cleaning water left over on the outer wall surface of the probe have been proposed, and there is such technology as described in Patent Literature 1 described above for example.

In a configuration of the apparatus described in Patent Literature 1, in order to prevent the cleaning water, sample, and reagent from attaching to the air outlet that discharges the compressed air, it is necessary to dispose the air outlet above a cleaning unit and at a distance from the probe.

However, when the air outlet is disposed above the cleaning unit and at a distance from the probe, there is a problem that the size of the cleaning bath becomes large. Also, when the atomized sample, reagent, and the like contaminate the air outlet, there is a problem that contaminated matters are scattered by discharging of the compressed air and possibility of contamination of the outer wall surface of the probe cannot be negated.

The present invention has been achieved in view of the problems described above, and is to provide a highly reliable automatic analyzer and a method for cleaning a probe that allows to remove the leftover cleaning water on the outer wall surface of the probe without increasing the size of a cleaning bath and without contaminating the outer wall surface of the probe.

Solution to Problem

In order to solve the problem described above, for example, configurations described in the claims are employed.

Although the present invention includes plural solutions solving the problem described above, an example is cited which is an automatic analyzer for conducting component analysis by performing measurement on a reaction liquid that was caused to react chemically in a reaction vessel, the automatic analyzer including a probe for suctioning a sample or a reagent and discharging the sample or the reagent to a reaction vessel, a cleaning bath for cleaning the probe, a cleaning water supply unit for supplying cleaning water for cleaning the probe to the cleaning bath, a compressed air supply unit for supplying compressed air to the cleaning bath, and a controller for controlling the probe, the cleaning water supply unit, and the compressed air supply unit, in which the cleaning bath includes a cleaning water outlet for discharging into the cleaning bath the cleaning water supplied from the cleaning water supply unit, and a compressed air outlet, disposed on the trajectory of the cleaning water discharged from the cleaning water outlet, and for discharging the compressed air supplied from the compressed air supply unit toward the probe inserted into the cleaning bath.

Advantageous Effects of Invention

According to the present invention, a highly reliable automatic analyzer can be achieved which allows to remove the leftover cleaning water on the outer wall surfaces of the probe without increasing the size of a cleaning bath and without contaminating the outer wall surface of the probe. Problems, configurations, and effects other than those described above will be clarified by explanation of the embodiments below.

DESCRIPTION OF EMBODIMENTS

Figure 1:
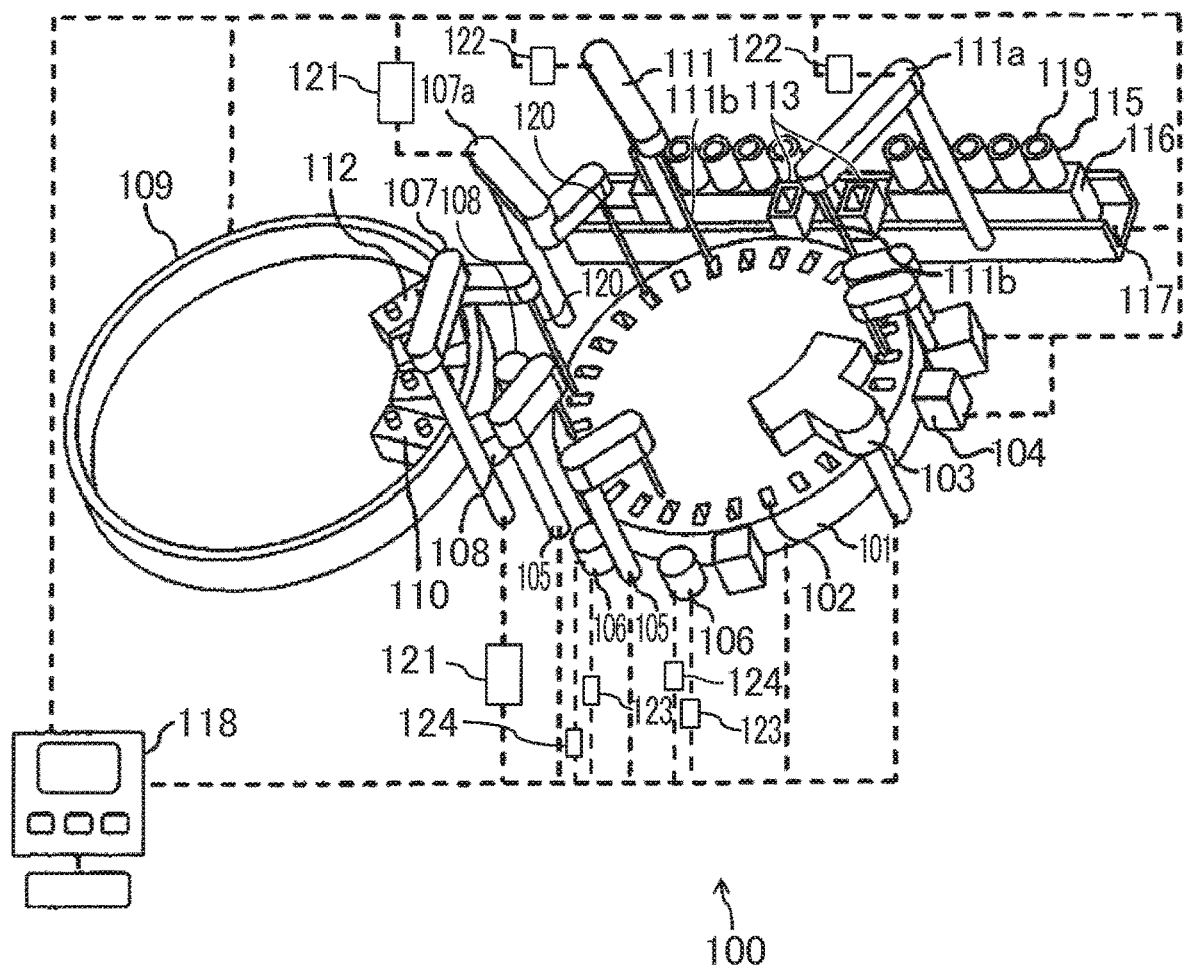
FIG. 1 is a schematic illustrating the overall structure of an automatic analyzer according to the present invention.

Embodiments of an automatic analyzer and a method for cleaning a probe of the present invention will be explained using FIG. 1 to FIG. 18. First, an outline of the overall automatic analyzer will be explained using FIG. 1. FIG. 1 shows an overall configuration of an automatic analyzer 100 related to the present embodiment.

As shown in FIG. 1, the automatic analyzer 100 is an apparatus for conducting component analysis by measuring a reaction liquid that is chemically reacted within a reaction vessel 102, and is configured generally of a reaction disk 101, a normal cleaning mechanism 103, a spectrophotometer 104, a stirring mechanism 105, a cleaning bath 106, a first reagent dispensing mechanism 107, a second reagent dispensing mechanism 107a, a cleaning bath 108, a reagent disk 109, sample dispensing mechanisms 111, 111a, a cleaning bath 113, a sample transfer mechanism 117, a controller 118, and the like.

On the reaction disk 102, the reaction vessels 102 are arrayed circumferentially. The reaction vessel 102 is a vessel for storing a mixed liquid obtained by mixing a sample and a reagent, and is arrayed by plural numbers on the reaction disk 101. In the vicinity of the reaction disk 101, the sample transfer mechanism 117 is disposed which transfers a sample rack 116 that mounts sample vessels 115.

Between the reaction disk 101 and the sample transfer mechanism 117, the sample dispensing mechanisms 111, 111a capable of rotation and vertical movement are disposed, and each of them includes a sample probe 111b. To the sample probe 111b, a sample syringe 122 is connected respectively. The sample probe 111b moves horizontally so as to create a circular arc around the rotation axis, moves vertically, and dispenses a sample from the sample vessel 115 to the reaction vessel 102.

The reagent disk 109 is storage on which a reagent bottle 110, a detergent bottle 112, and the like can be mounted by plural numbers on the circumference of a circle, a reagent being stored within the reagent bottle 110. The reagent disk 109 is kept cool.

Between the reaction disk 101 and the reagent disk 109, the first reagent dispensing mechanism 107 and the second reagent dispensing mechanism 107a capable of rotation and vertical movement are disposed, and each of them includes a reagent probe 120. The reagent probe 120 is moved vertically and horizontally by the reagent dispensing mechanism 107 or the reagent dispensing mechanism 107a. To the reagent probe 120, a reagent syringe 121 is connected respectively. By this reagent syringe 121, the reagent, the detergent, the diluting liquid, the pretreatment reagent, and the like suctioned from the reagent bottle 110, the detergent bottle 112, a diluting solution bottle, a pretreatment reagent bottle, and the like through the reagent probe 120 are dispensed to the reaction vessels 102.

Around the reaction disk 101, there are disposed the normal cleaning mechanism 103 that cleans the inside of the reaction vessel 102, the spectrophotometer 104 for measuring the absorbance of the light for measurement having passed through the mixed liquid inside the reaction vessel 102, the stirring mechanism 105 for mixing the sample and the reagent dispensed to the reaction vessel 102, and so on.

Also, the cleaning bath 108 for the reagent probe 120 is disposed on the motion range of the first reagent dispensing mechanism 107 and the second reagent dispensing mechanism 107a, the cleaning bath 113 for the sample probe 111b is disposed on the motion range of the sample dispensing mechanisms 111, 111a, and the cleaning bath 106 for the stirring mechanism 105 is disposed on the motion range of the stirring mechanism 105 respectively.

Each of the cleaning baths 113, 108, 106 includes a cleaning water supply mechanism (cleaning water supply unit) 123 (illustration of the portions connected to the cleaning bath 113 and the cleaning bath 108 is omitted for the convenience of illustration) for supplying the cleaning water for cleaning the sample probe 111b, the reagent probe 120, or the stirring mechanism 105 to each cleaning bath, and a compressed air supply mechanism (compressed air supply unit) 124 (illustration of the portions connected to the cleaning bath 113 and the cleaning bath 108 is omitted for the convenience of illustration) for supplying the compressed air to each cleaning bath, each mechanism is connected to the controller 118, and the motion of each mechanism is controlled by the controller 118.

The controller 118 is configured of a computer and the like, controls the motion of each mechanism described above within the automatic analyzer, and conducts a calculation process of obtaining the concentration of a predetermined component in the liquid sample such as the blood, urine, and the like.

The above is a general configuration of the automatic analyzer.

The analyzing process for the test sample by such automatic analyzer as described above is conducted generally according to the order described below.

First, a sample inside the sample vessel 115 mounted on the sample rack 116 transferred to the vicinity of the reaction disk 101 by the sample transfer mechanism 117 is dispensed to the reaction vessel 102 on the reaction disk 101 by the sample probes 111b of the sample dispensing mechanisms 111, 111a. Next, the reagent used for the analysis is dispensed from the reagent bottle 110 on the reagent disk 109 to the reaction vessel 102 to which the sample has been dispensed in advance by the first reagent dispensing mechanism 107 or the second reagent dispensing mechanism 107a. Then, the mixed liquid of the sample and the reagent inside the reaction vessel 102 is stirred by the stirring mechanism 105.

Thereafter, the light generated from a light source is made to transmit through the reaction vessel 102 containing the mixed liquid, and the light intensity of the transmitted light is measured by the spectrophotometer 104. The light intensity measured by the spectrophotometer 104 is transmitted to the controller 118 through an A/D converter and an interface. Also, calculation is conducted by the controller 118 to obtain the concentration of a predetermined component in the liquid sample such as the blood, urine, and the like, and the result is displayed on a display unit (illustration is omitted), and the like.

Figure 2:
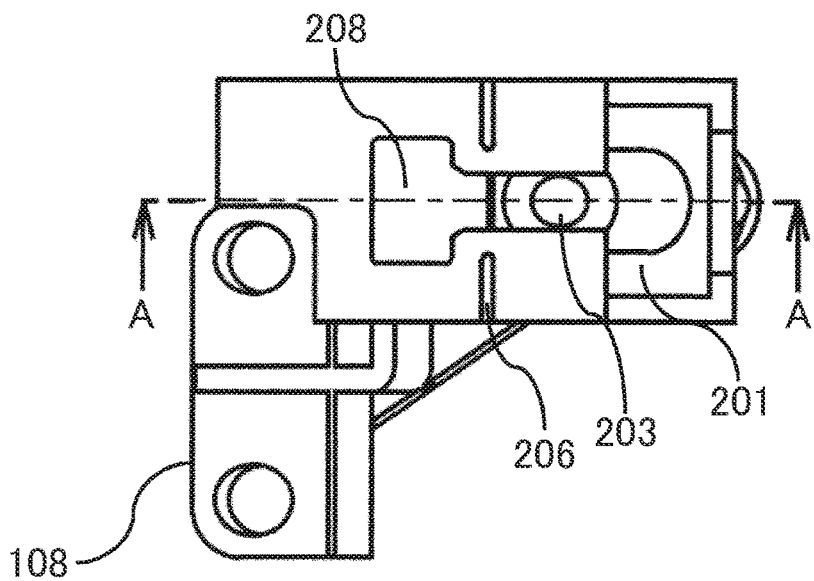
FIG. 2 is a top view of a cleaning bath according to an embodiment of the invention.

Next, the configuration of the cleaning bath will be explained referring to FIG. 2 and onward citing an example of the cleaning bath 108 for cleaning the reagent probe 120. Because the cleaning bath 113 for the sample probe 111b and the cleaning bath 106 for the stirring mechanism 105 have a configuration generally same to that of the cleaning bath 108, the detailed explanation will be omitted. FIG. 2 is a top view of the cleaning bath 108 according to an embodiment of the present invention, FIG. 3 is a cross section of the cleaning bath 108, and FIG. 4 is a cross section obtained when the cleaning bath 108 is viewed from its right side of the front face.

Figure 3:
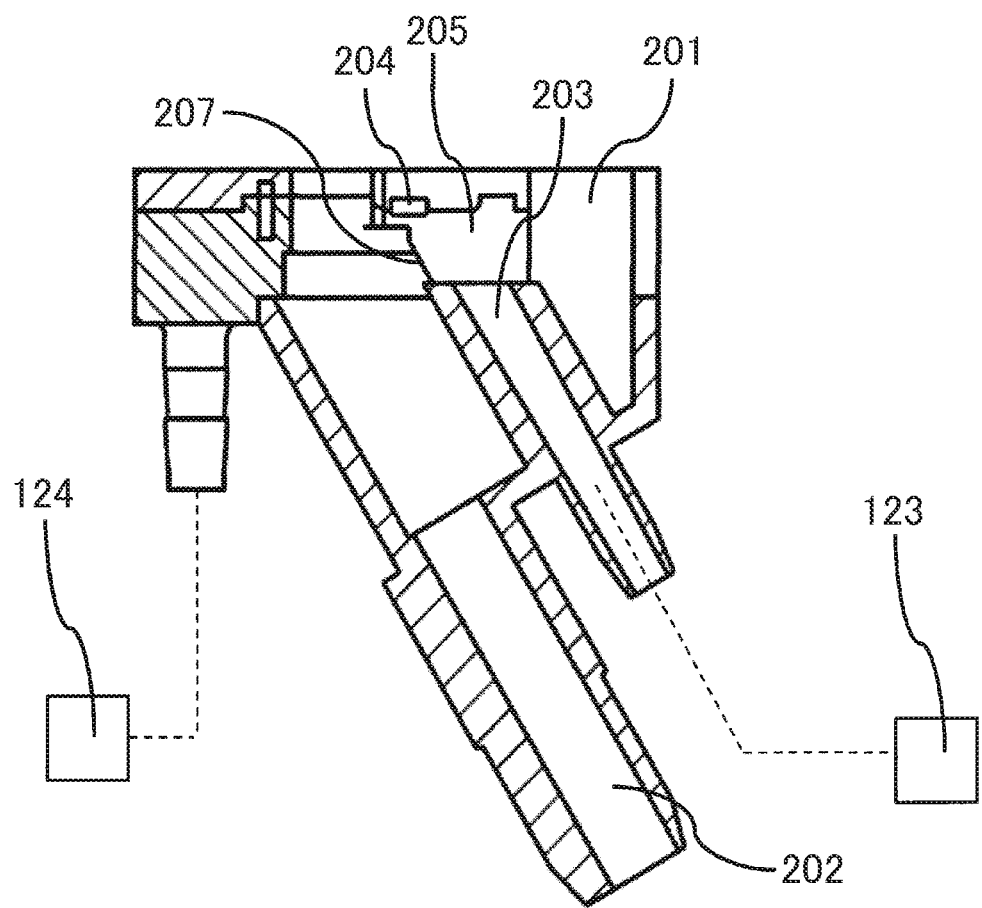
FIG. 3 is a cross section of a cleaning bath according to an embodiment of the invention.
Figure 4:
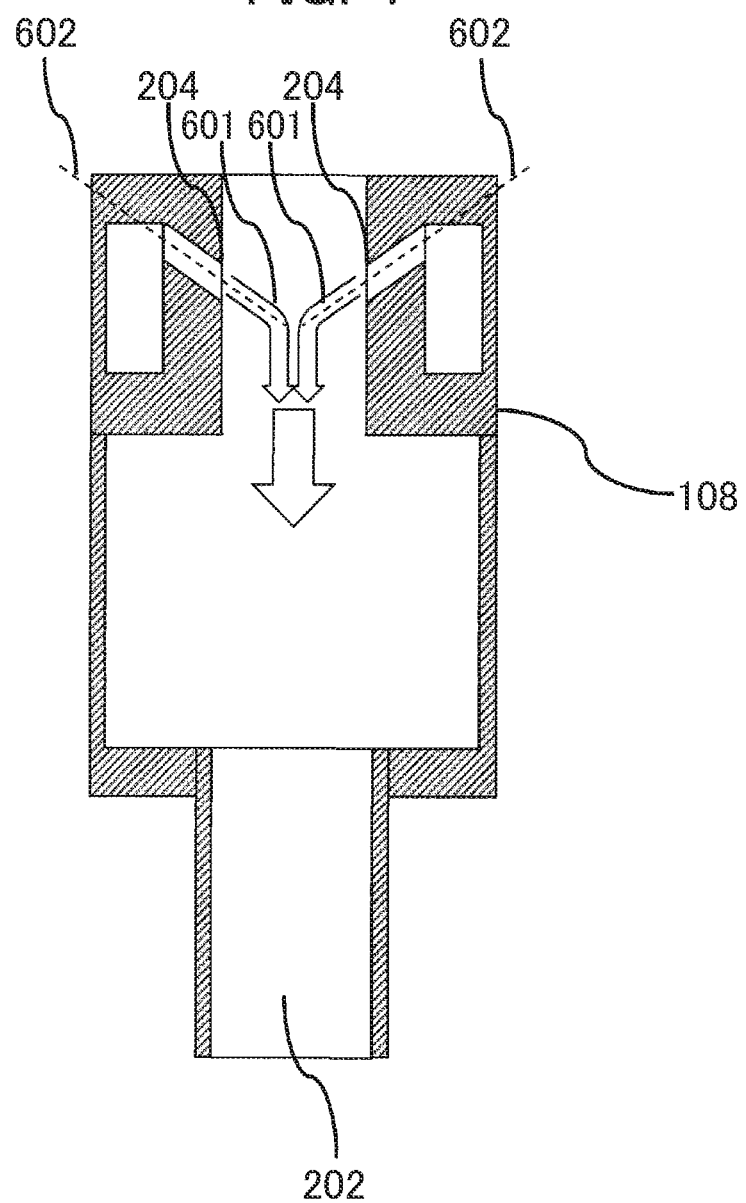
FIG. 4 is a cross section obtained when a cleaning bath according to an embodiment of the invention is viewed from its right side.

As shown in FIG. 2 and FIG. 3, the cleaning bath 108 in the present embodiment has a construction of including the upper opening 201 so that the reagent probe 120 can get access to the upper part of the cleaning bath 108 for cleaning, and including the lower opening 202 in the lower part so that the cleaning water can be drained.

Also, on the obliquely lower side of a position of the cleaning bath 108, the reagent probe 120 getting access to the position, there is provided a cleaning water outlet 203 for discharging the cleaning water toward the reagent probe 120 that has got access. This cleaning water outlet 203 is connected to a cleaning water supply mechanism 123.

The cleaning water supply mechanism 123 can have a general configuration of a pump, a syringe, and the like which are capable of supplying liquid.

At the upper side surface of the cleaning water outlet 203, a wall 205 is arranged. The wall 205 is disposed so that the cleaning water discharged from the cleaning water outlet 203 flows toward the reagent probe 120 while contacting the wall 205, and is configured to be capable of positively guiding the cleaning water discharged from the cleaning water outlet 203 located below to the upper side of the reagent probe 120.

On a flow passage (trajectory) of the cleaning water discharged from the cleaning water outlet 203, a compressed air outlet 204 is provided which discharges compressed air supplied from a compressed air supply mechanism 124 toward the reagent probe 120 in order to remove the cleaning water left over on the outer wall surface of the reagent probe 120. This compressed air outlet 204 is an opening arranged in the wall 205 located obliquely above as viewed from the cleaning water outlet 203, and is configured to be cleaned by the cleaning water discharged obliquely upward from the cleaning water outlet 203. The compressed air outlet 204 is connected to the compressed air supply mechanism 124.

The compressed air supply mechanism 124 can have a general configuration of a pump, a compressor, and the like which can feed the air, and is configured to be capable of controlling the air blowing volume in several stages in the present embodiment.

As shown in FIG. 4, a central axis 602 of the outlet is disposed obliquely downward so that the compressed air discharged from the compressed air outlet 204 is discharged downward smoothly as a flow 601 of the compressed air. It is constructed so as to prevent the leftover water on the outer wall surface of the reagent probe 120 from being whirled up when the compressed air discharged from the compressed air outlets 204 of both sides is blown to the reagent probe 120 by discharging the compressed air downward smoothly. Also, it is preferable that the compressed air outlet 204 is disposed so that the compressed air discharged from the compressed air outlets 204 of both sides is blown to the distal end of the reagent probe 120 when the reagent probe 120 is positioned at a most elevated position where the reagent probe 120 can rotate. Also, as shown in FIG. 2 and FIG. 3, there is a notch for allowing the probe to pass through at the end of the right side in the drawing, and the cleaning bath 108 is configured so as to allow rotatable movement of the probe to the inside of the cleaning bath 108 or rotatable movement of the probe from the inside of the cleaning bath 108 through this notch.

Returning to FIG. 2 and FIG. 3, in order to form a flow passage of the cleaning water discharged from the cleaning water outlet 203, an edge 207 and a hole 208 are formed in the wall 205 described above. The edge 207 is worked in parallel to the discharging direction of the cleaning water, and is formed on the side close to a position of the cleaning water outlet 203, the reagent probe 120 getting access to the position at the time of cleaning. The hole 208 is formed on the opposite side of the cleaning water outlet 203 with respect to the position to which the reagent probe 120 get access at the time of cleaning, and is a portion where the width of the upper opening 201 is widened in order to drop the cleaning water having been guided to the upper part of the reagent probe 120 to the lower part.

Also, on the upper surface side of the cleaning bath 108, a mark 206 is formed which is for facilitating positional adjustment between the position to which the reagent probe 120 gets access at the time of cleaning and the compressed air outlet 204.

A flow of the cleaning water affected by the shape of the wall 205 of the upper side surface of the cleaning water outlet 203 will be explained using FIG. 5, FIG. 6, and FIG. 7.

Figure 5:
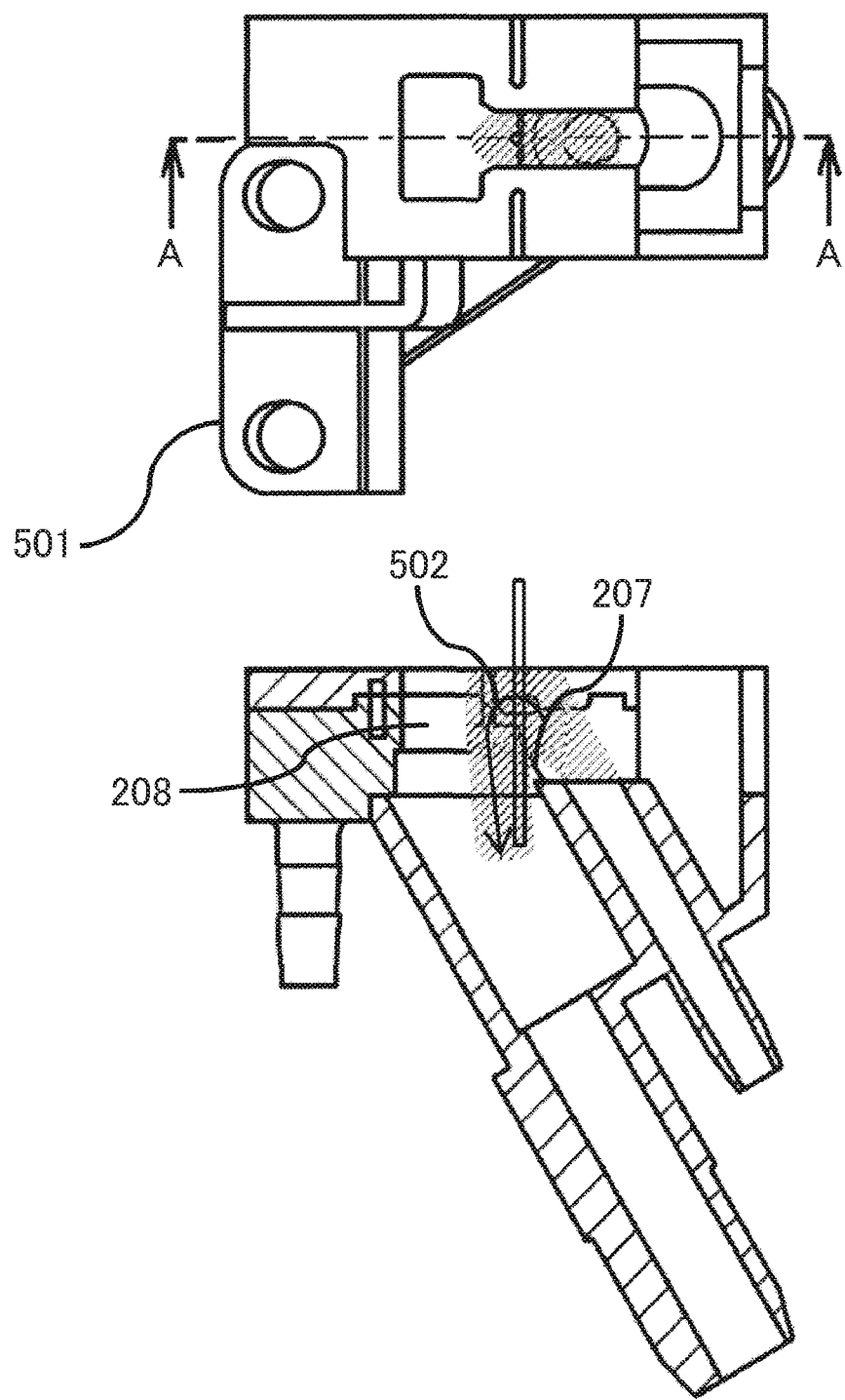
FIG. 5 is a schematic illustrating an example of the cleaning bath of the automatic analyzer of the invention.

FIG. 5 is a drawing that expresses a flow of the cleaning water when the edge 207 and the hole 208 are provided in the wall that forms a flow of the cleaning water of the cleaning bath, the edge 207 being worked in parallel to the discharging direction of the cleaning water, the width of the upper opening 201 being widened in the hole 208 in order to drop the cleaning water having been guided to the upper part to the lower part. FIG. 6 is a drawing that shows another example of the cleaning bath of the present embodiment, and is a drawing that expresses a flow of the cleaning water when the wall does not include the edge 207 and the hole 208. FIG. 7 is also a drawing that shows still other example of the cleaning bath of the present embodiment, and is a drawing that expresses a flow of the cleaning water when the wall includes only the hole 208.

As shown in FIG. 5, in the case of a cleaning bath 501 that includes a wall including the hole 208 whose width is enlarged and the edge 207, some of the cleaning water discharged from the cleaning water outlet 203 reaches the edge 207 before reaching the upper part of the probe or the stirring mechanism. Therefore, the cleaning water spreads to the wall side from the edge 207 portion, and flows to the lower part. Accordingly, by this flow of the downward direction, all of the cleaning water discharged from the cleaning water outlet 203 flows to the direction of a flow 502 of the cleaning water without creating a large arc. Therefore, the cleaning water hits the distal end side also of the probe or the stirring mechanism, and sufficient cleaning effect can be secured. Also, when the cleaning water after cleaning reaches the portion of the hole 208, the cleaning water starts to drop from the position, and is guided to the lower opening 202 without reaching the end surface of the upper opening 201. Accordingly, the risk that the cleaning water having hit the end surface of the upper opening 201 is scattered is quite low, therefore there is no possibility that the cleaning water is scattered to the outside of the cleaning bath, and high cleanliness of the cleaning bath is achieved.

Figure 6:
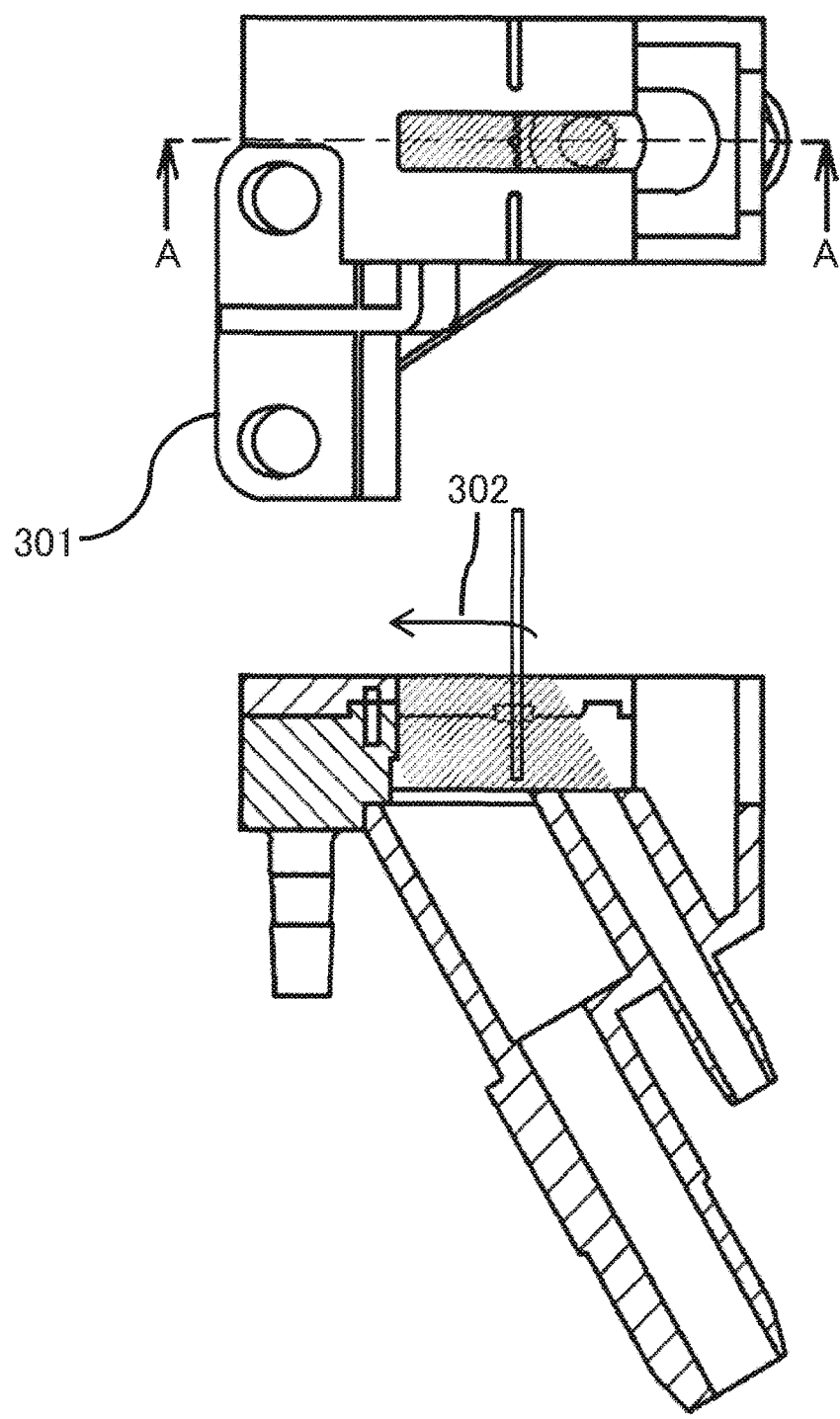
FIG. 6 is a schematic illustrating another example of the cleaning bath of the automatic analyzer of the invention.

On the other hand, as shown in FIG. 6, in the case of a cleaning bath 301 in which the edge 207 and the hole 208 whose width is widened described above are not provided, the cleaning water discharged from the cleaning water outlet 203 located in the lower part of the cleaning bath 301 flows to the direction of a flow 302 of the cleaning water while contacting the wall because there is not the edge 207, and reaches the end surface of the upper opening 201 because there is not the hole 208. In the cleaning bath 301 shown in FIG. 6, although the range where the probe and the stirring mechanism can be cleaned is narrow compared to that of the cleaning bath 501, sufficient cleaning can be conducted.

Figure 7:
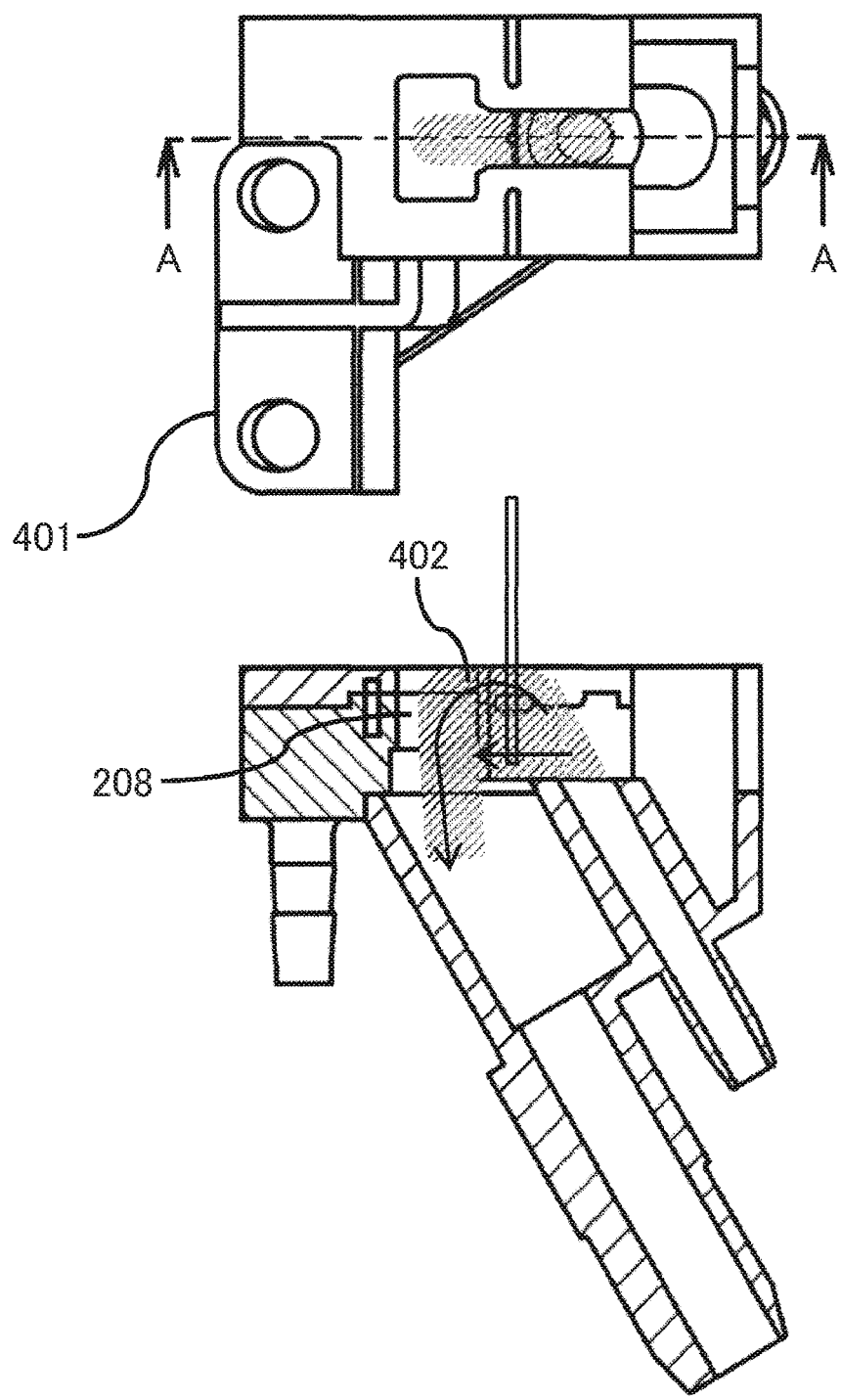
FIG. 7 is a schematic illustrating still another example of the cleaning bath of the automatic analyzer of the invention.

Also, as shown in FIG. 7, in the case of a cleaning bath 401 that includes only the hole 208 whose width is enlarged, the cleaning water discharged from the cleaning water outlet 203 located in the lower part of the cleaning bath 401 reaches the lower part, thereafter drops downward if there is no more wall, and is drained by the lower opening 202. Further, the cleaning water that flows along the wall in the lower part of the cleaning bath 401 flows in the lateral direction, and therefore flows to the direction of a flow 402 of the cleaning water so as to create a large arc in the upper part of the cleaning bath 401. Therefore, also in the cleaning bath 401 shown in FIG. 7, although the range where the probe and the stirring mechanism can be cleaned is narrow compared to that of the cleaning bath 501 shown in FIG. 5, sufficient cleaning can be conducted, and higher cleanliness of the cleaning bath compared to the cleaning bath 301 shown in FIG. 6 is achieved.

Figure 8:
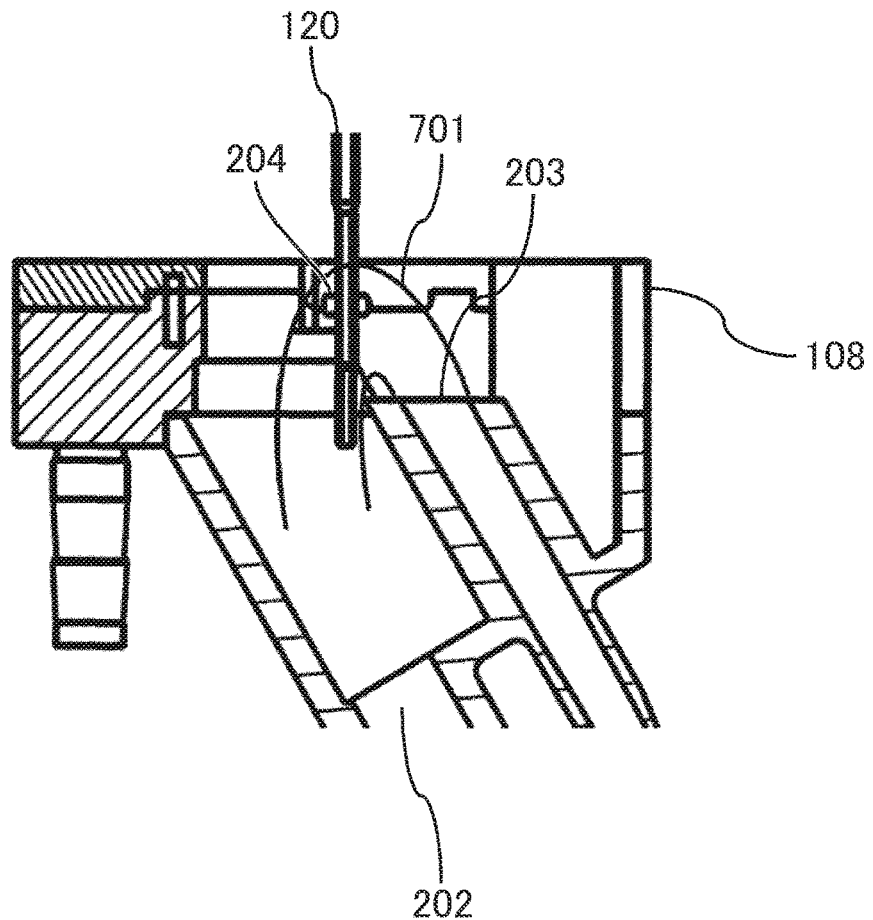
FIG. 8 is a schematic illustrating cleaning water being discharged from a cleaning water outlet in the automatic analyzer of the invention.

Next, the condition in discharging the cleaning water from the cleaning water outlet 203 will be explained using FIG. 8. FIG. 8 is a schematic drawing illustrating the cleaning water being discharged from the cleaning water outlet 203.

As shown in FIG. 8, when the reagent probe 120 after discharging the reagent to the reaction vessel 102 is to be cleaned, first, the reagent probe 120 is moved to the cleaning bath 108 (transferal step). Next, in order to secure an appropriate cleaning range, the reagent probe 120 is lowered in the inside of the cleaning bath 108, and the inner wall and the outer wall of the reagent probe 120 are cleaned (cleaning step).

In this cleaning step, cleaning of the inner wall of the reagent probe 120 is conducted by passing the water through the inside of the reagent probe 120 by a pump not illustrated and discharging the flowing water located in the inside of the reagent probe 120. Also, cleaning of the outer wall of the reagent probe 120 is conducted by discharging the cleaning water held in a water supply tank located in the inside of the cleaning water supply mechanism 123 from the cleaning water outlet 203 located in the inside of the cleaning bath 108 to the obliquely upper side toward the outer wall of the reagent probe 120 as a trajectory 701 of the cleaning water. The cleaning water after cleaning is discharged from the lower opening 202.

At this time of cleaning the outer wall, there is a case that the cleaning water is left over on the outer wall surface of the reagent probe 120. Unless this cleaning water left over on the outer wall surface of the reagent probe 120 is removed, the cleaning water comes to be brought in to the reagent at the time of next dispensing. Therefore, it is conducted to remove the cleaning water left over in the reagent probe 120 by discharging the compressed air from the compressed air outlet 204 toward the surface of the outer wall of the probe.

Here, when the compressed air outlet 204 has been contaminated, it possibly occurs that the cleaning water attached to the compressed air outlet 204 by the discharged compressed air is scattered to the reagent probe 120 having been cleaned and contaminates the reagent probe 120.

However, in the cleaning bath 108 of the present embodiment, the compressed air outlet 204 is disposed within the trajectory 701 of the cleaning water discharged from the cleaning water outlet 203. Therefore, cleaning of the compressed air outlet 204 is conducted along with cleaning of the reagent probe 120. Thus, by conducting cleaning of the compressed air outlet 204 along with cleaning of the reagent probe 120, at the time of discharging the compressed air, a state that the compressed air outlet 204 is not contaminated can be maintained.

Here, by conducting cleaning of the compressed air outlet 204 along with cleaning of the probe or the stirring mechanism by the cleaning water, such problems as described below possibly occur. Below, the problems and the method for solving the problems will be explained using FIG. 9 to FIG. 18. First, the problems that will possibly occur will be explained using FIG. 9 to FIG. 12. FIG. 9 to FIG. 12 are drawings that explain how a reagent probe is contaminated by the leftover water discharged from the compressed air outlet 204.

Figure 9:
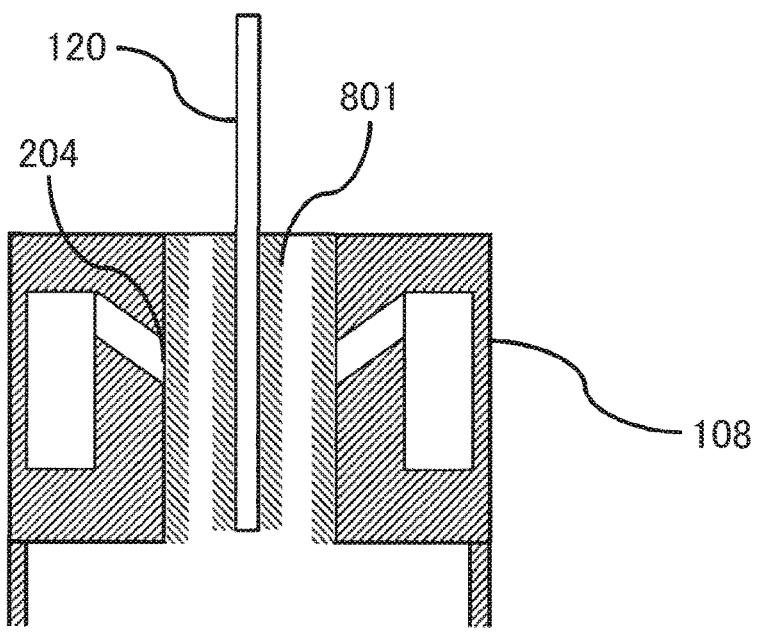
FIG. 9 illustrates how a reagent probe is contaminated by the leftover water discharged from a compressed air outlet in an automatic analyzer.
Figure 10:
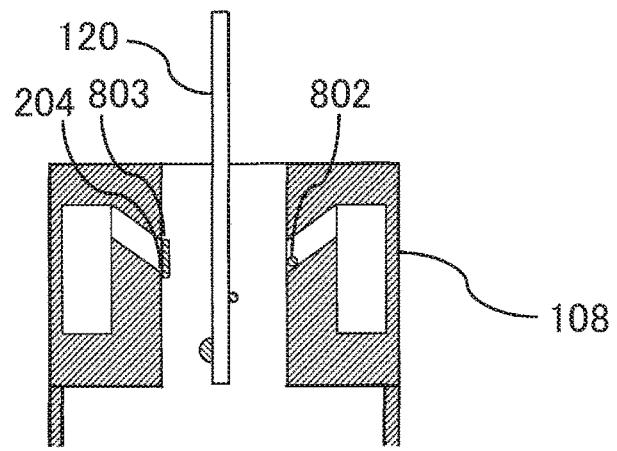
FIG. 10 illustrates how the reagent probe is contaminated by the leftover water discharged from the compressed air outlet.
Figure 11:
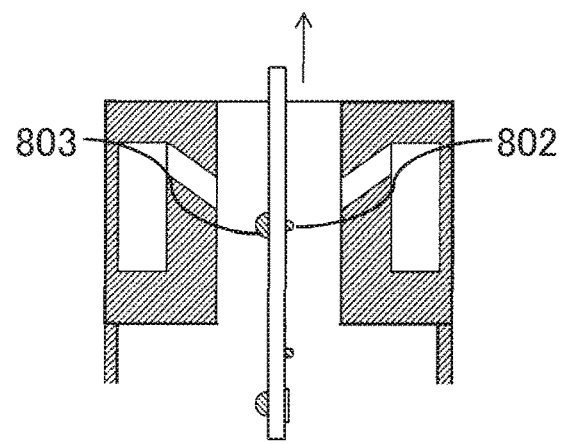
FIG. 11 illustrates how the reagent probe is contaminated by the leftover water discharged from the compressed air outlet.
Figure 12:
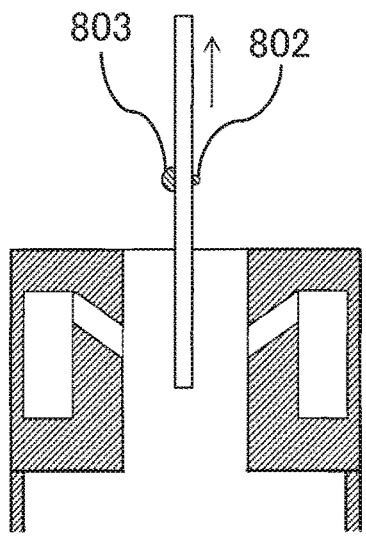
FIG. 12 illustrates how the reagent probe is contaminated by the leftover water discharged from the compressed air outlet.

As shown in FIG. 9, first, the compressed air outlet 204 is cleaned by cleaning water 801. After the cleaning, as shown in FIG. 10, leftover water 802 and a film 803 of the cleaning water are possibly formed in the compressed air outlet 204. Next, in order to dry all of the cleaning range of the reagent probe 120, the reagent probe 120 is lowered further within the cleaning bath 108. After finishing this further lowering of the reagent probe 120, the compressed air is discharged from the compressed air outlet 204 toward the reagent probe 120. At this time, as shown in FIG. 11, there is a possibility that the leftover water 802 and the water of the film 803 attached to the compressed air outlet 204 fly to the reagent probe 120 along with the compressed air discharged from the compressed air outlet 204, and that the reagent probe 120 is contaminated. Thereafter, as shown in FIG. 12, the reagent probe 120 is raised while the outer wall surface of the reagent probe 120 is contaminated, and starts to move to the reagent disk 109. As a result, when next reagent is to be suctioned, the next reagent comes to be thinned.

Figure 13:
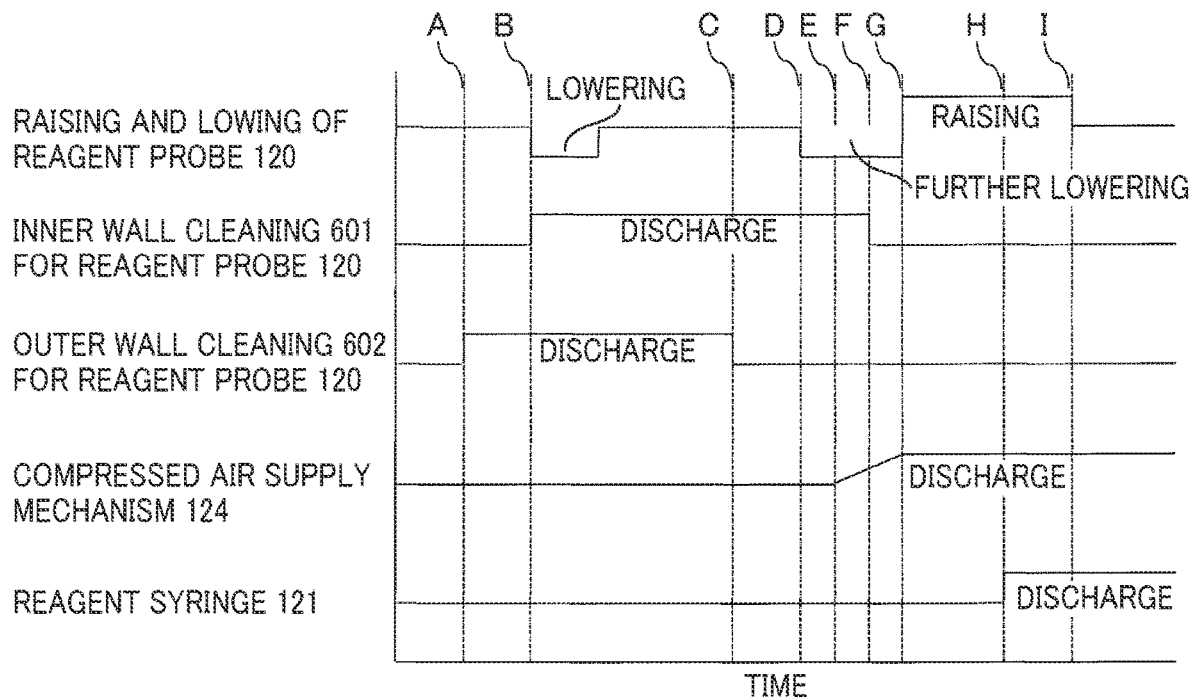
FIG. 13 is a time chart for cleaning a reagent probe in the automatic analyzer of the invention.

As a countermeasure for it, control based on the cleaning motion time chart for the reagent probe shown in FIG. 13 is conducted by a command from the controller 118 according to a program stored in the controller 118. Below, the motion of the reagent probe 120, inner wall cleaning 901 of the reagent probe, outer wall cleaning 902 of the reagent probe, the compressed air supply mechanism 124, and the reagent syringe 121 will be explained using FIG. 13.

In FIG. 13, at the time a, in order to conduct the outer wall cleaning 902 of the reagent probe 120, the cleaning water is discharged from the cleaning water outlet 203 that is located in the inside of the cleaning bath 180. Then, at the time b, the reagent probe 120 is made to enter into the cleaning bath 108, and is lowered in order to secure an appropriate cleaning range. At the same time, in order to conduct the inner wall cleaning 901 of the reagent probe 120, flowing water inside the reagent probe 120 is discharged by the pump. Next, at the time c, discharging of the cleaning water for conducing the outer wall cleaning 902 of the reagent probe 120 is stopped.

Next, at the time d, further lowering of the reagent probe 120 is conducted inside the cleaning bath 108 in order to dry all of the cleaning range, and at the time e, the compressed air is discharged from the compressed air outlet 204 toward the reagent probe 120. The compressed air supply mechanism 124 is controlled so as to discharge a small volume of the compressed air at the time of starting to discharge the compressed air, and to gradually increase the discharge volume.

Next, at the time f, flowing of the water caused by the pump for conducting the inner wall cleaning 901 of the reagent probe 120 is stopped. Thereafter, at the time g, the reagent probe 120 is raised toward a position where the reagent probe 120 can be rotated. At this time also, the controller 118 makes the compressed air to be discharged toward the reagent probe 120.

Next, at the time h, in order to prepare the next dispensing, discharging motion of the liquid located in the inside of the reagent probe 120 is started by the reagent syringe 121 that is connected to the reagent probe 120.

Next, at the time i, rising of the reagent probe 120 finishes. Thereafter, after finishing the discharging motion for preparing the next dispensing conducted by the reagent syringe 121, the reagent probe 120 starts to move to the reagent disk 109, and discharging of the compressed air is stopped.

By such motion as described above, the leftover water 802 and the water of the film 803 discharged from the compressed air outlet 204 can be removed also from the surface of the reagent probe 120. Below, how to remove the leftover water 802 and the film 803 discharged from the compressed air outlet 204 will be explained using FIG. 14 to FIG. 18. FIG. 14 to FIG. 18 are drawings that explains how to remove the leftover water 802 and the water of the film 803 discharged from the compressed air outlet 204.

First, as shown in FIG. 9 described above, the compressed air outlet 204 is also cleaned by the cleaning water along with cleaning of the reagent probe 120. After cleaning, as shown in FIG. 10 described above, the leftover water 802 and the film 803 of the cleaning water 801 are possibly formed in the compressed air outlet 204.

Next, in order to dry all of the cleaning range of the reagent probe 120, further lowering is conducted inside the cleaning bath 108 (the time d of FIG. 13).

Figure 14:
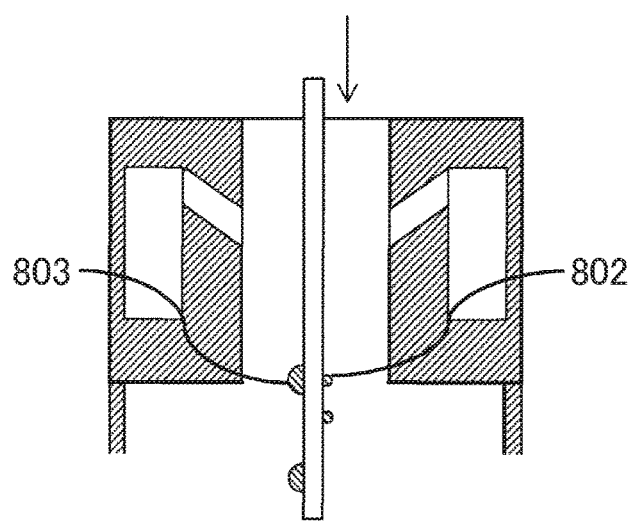
FIG. 14 illustrates how the automatic analyzer of the invention removes the leftover water discharged from a compressed air outlet.

After starting this further lowering of the reagent probe 120 and before the reagent probe 120 reaches the lowest point, the compressed air heading to the reagent probe 120 is discharged from the compressed air outlet 204 (the time e of FIG. 13). The discharge volume of the compressed air at this time is made a small volume at the time of starting discharging as described above, and the discharge volume is gradually increased. At this time, the leftover water 802 and the water of the film 803 attached to the compressed air outlet 204 possibly fly to the reagent probe 120 along with the compressed air discharged from the compressed air outlet 204, and the reagent probe 120 is possibly contaminated (FIG. 11). However, the discharge volume of the compressed air before reaching the lowest point is gradually increased from the time of starting discharging, thereby the leftover water 802 and the water of the film 803 attached to the reagent probe 120 at the time of discharging the compressed air are attached to the distal end side of the reagent probe 120 without being conveyed to the upper side of the reagent probe 120 by the compressed air of the small volume, and are conveyed to the lower part of the cleaning bath by the further lowering motion of the reagent probe 120 (FIG. 14).

After the reagent probe 120 reaches the lowest point, the discharge volume of the compressed air is increased (the time g of FIG. 13), the rising motion of the reagent probe 120 is started, and the reagent probe 120 is raised to a position where the reagent probe 120 can be taken out from the cleaning bath 108 and can rotate for the next dispensing of the reagent.

Figure 15:
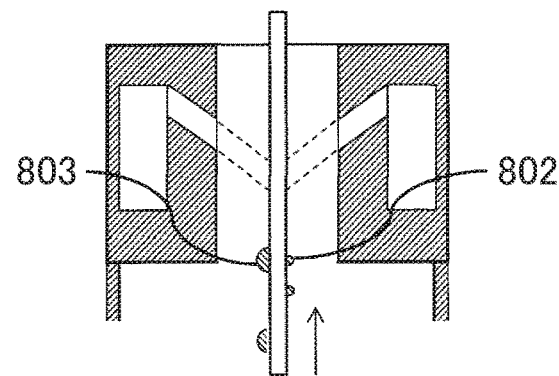
FIG. 15 illustrates how the automatic analyzer of the invention removes the leftover water discharged from the compressed air outlet.
Figure 16:
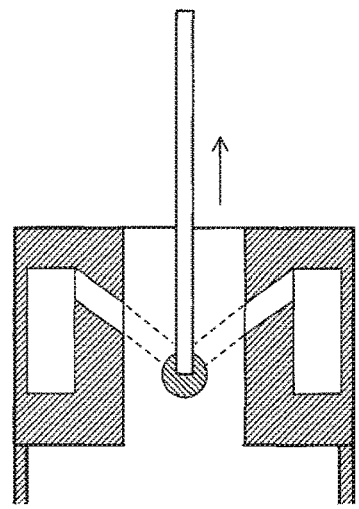
FIG. 16 illustrates how the automatic analyzer of the invention removes the leftover water discharged from the compressed air outlet.

During this rising of the reagent probe 120 also, the compressed air is discharged, and the leftover cleaning water is removed. At this time, because the compressed air outlet 204 is disposed so as to discharge the compressed air obliquely downward and further lowering has been conducted, as shown in FIG. 15, the compressed air is discharged so that the leftover water is taken off from the side upper than the cleaning range of the reagent probe 120 toward the distal end of the reagent probe 120. Because the reagent probe 120 rises while keeping this state, as shown in FIG. 16, the leftover water of the cleaning water attached to the cleaning range gathers to the distal end of the reagent probe 120.

Figure 17:
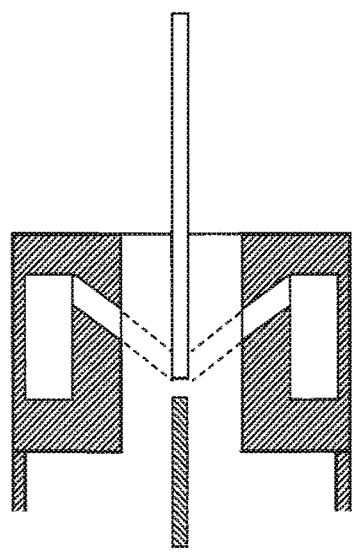
FIG. 17 illustrates how the automatic analyzer of the invention removes the leftover water discharged from the compressed air outlet.

Next, during the rising motion to the position where the reagent probe 120 can rotate, the discharge motion of the liquid located in the inside of the reagent probe 120 is conducted by the reagent syringe 121 connected to the reagent probe 120 to prepare for the next dispensing. At this time, as shown in FIG. 17, the leftover water of the cleaning water gathered to the distal end of the reagent probe 120 by the compressed air is guided together to the lower opening 202 of the lower part of the cleaning bath 108 by the liquid located in the inside of the reagent probe 120 having been discharged.

Figure 18:
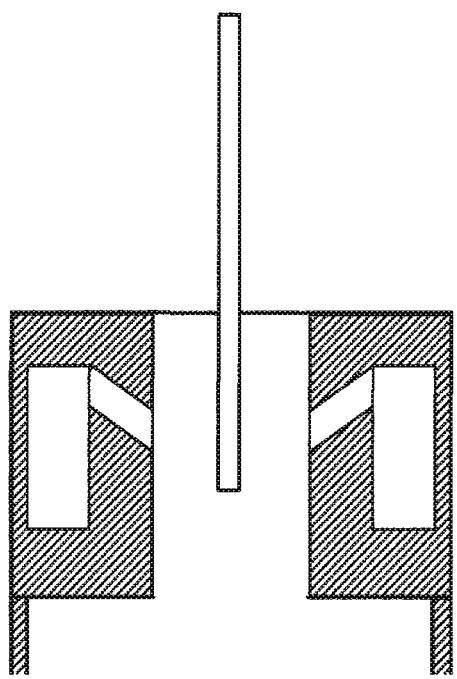
FIG. 18 illustrates how the automatic analyzer of the invention removes the leftover water discharged from the compressed air outlet.

By these motions, the leftover water 802 and the water of the film 803 attached at the time of discharging the compressed air can be removed by the compressed air (FIG. 18).

Also, according to a drying method of blowing the compressed air to the reagent probe 120 without adjusting the blow volume and causing the water left over on the outer wall surface to fly as a traditional way, although there is not any problem when a flow of the air is formed by arranging a suction port or a suction mechanism for the air at the lower part of the cleaning bath, and so on, when the flow of the discharged compressed air is not sufficient, the leftover cleaning water is scattered together when the leftover cleaning water on the outer wall surface of the probe is removed by the compressed air, and there is a risk of affecting the accuracy of the sample evaluation in the worst case.

However, according to the cleaning motion in the automatic analyzer of the present embodiment, because the leftover water 802 and the water of the film 803 are removed by the air volume of a small volume, it is not necessary to arrange a suction port and a suction mechanism, and a drying mechanism by the compressed air can be installed.

Next, the effects of the present embodiment will be explained.

In the embodiment of the automatic analyzer and the cleaning method of the present invention described above, the cleaning bath 113, 108, 106 includes the cleaning water outlet 203 for discharging the cleaning water supplied from the cleaning water supply unit 123 into the cleaning bath 113, 108, 106, and the compressed air outlet 204 disposed on a trajectory of the cleaning water discharged from the cleaning water outlet 203 and discharging the compressed air supplied from the compressed air supply mechanism 124 toward the sample probe 111b, the reagent probe 120, or the stirring mechanism 105 inserted into the cleaning bath 113, 108, 106.

Therefore, such event can be prevented that the contaminated water having been attached to the compressed air outlet 204 by the discharged compressed air is scattered to the sample probe 111b, the reagent probe 120, or the stirring mechanism 105 after cleaning and the sample probe 111b, the reagent probe 120, or the stirring mechanism 105 after cleaning are contaminated, and the leftover water of the cleaning water on the outer wall surface of the probe can be removed without enlarging the cleaning bath and without contaminating the outer wall surface of the probe. Accordingly, such event that the cleaning water is carried over to dispensing and stirring of the next time can be reduced compared to the past, and an automatic analyzer having high analysis accuracy namely high reliability can be provided without affecting the accuracy of the sample evaluation.

Also, in the cleaning bath 113, 108, 106, cleaning of the compressed air outlet 204 is conducted by the cleaning water along with cleaning of the sample probe 111b, the reagent probe 120, or the stirring mechanism 105, therefore cleaning of the compressed air outlet 204 is conducted along with cleaning of the sample probe 111b, the reagent probe 120, or the stirring mechanism 105, such state can be maintained that the compressed air outlet 204 is not contaminated constantly at the time of discharging the compressed air, and more reliable cleaning can be conducted.

Further, because the cleaning water outlet 203 is disposed obliquely below the compressed air outlet 204 and the compressed air outlet 204 is cleaned by the cleaning water discharged obliquely upward from the cleaning water outlet 203, the trajectory of the cleaning water discharged from the cleaning water outlet 203 can be secured widely on a parabola, the cleaning range of the sample probe 111b, the reagent probe 120, or the stirring mechanism 105 can be widened further, and more efficient cleaning can be conducted.

Also, with respect to the cleaning bath 113, 108, 106, the wall (side wall) 205 is arranged on the upper side surface side of the cleaning water outlet 203 in order to guide the cleaning water having been discharged from the cleaning water outlet 203 to the sample probe 111b, the reagent probe 120, or the stirring mechanism 105, thereby the cleaning water hits the sample probe 111b, the reagent probe 120, or the stirring mechanism 105 more precisely and with higher reproducibility, and therefore the cleaning effect can be improved further.

Furthermore, with respect to the wall 205 of the cleaning bath 113, 108, 106, such hole 208 is formed that the space on the opposite side of the cleaning water outlet 203 of the position where the sample probe 111b, the reagent probe 120, or the stirring mechanism 105 are inserted is widened, thereby the cleaning water after having cleaned the sample probe 111b, the reagent probe 120, or the stirring mechanism 105 can be guided positively to the lower opening 202, and the automatic analyzer having higher cleanliness of the surroundings of the cleaning bath 113, 108, 106 can be obtained.

Also, because the wall 205 includes the edge 207 that is formed in a same direction to the discharging direction of the cleaning water and this edge 207 is formed on the side closer to the sample probe 111b, the reagent probe 120, or the stirring mechanism 105 of the cleaning water outlet 203, the cleaning water discharged from the cleaning water outlet 203 can be widened more, and the cleaning range of the sample probe 111b, the reagent probe 120, or the stirring mechanism 105 can be widened. Therefore, more efficient cleaning can be conducted.

Further, the cleaning bath 113, 108, 106 includes the mark 206 at the upper surface side of the cleaning bath 113, 108, 106, the mark 206 being for showing a position where the sample probe 111b, the reagent probe 120, or the stirring mechanism 105 is inserted, thereby positional adjustment between the sample probe 111b, the reagent probe 120, or the stirring mechanism 105 and the compressed air outlet 204 can be facilitated at the time of maintenance and the like, and more precise cleaning can be conducted.

Also, the controller 118 controls the compressed air supply mechanism 124 so as to discharge the compressed air when the sample probe 111b, the reagent probe 120, or the stirring mechanism 105 is raised after cleaning the sample probe 111b, the reagent probe 120, or the stirring mechanism 105, thereby the leftover water 802 and the water of the film 803 left over in the compressed air outlet 204 and attached to the sample probe 111b, the reagent probe 120, or the stirring mechanism 105 at the time of discharging the compressed air can be removed, and it comes that more reliable analysis can be conducted.

Further, the controller 118 gathers the leftover water of the cleaning water attached to the sample probe 111b and the reagent probe 120 to the distal end of the sample probe 111b and the reagent probe 120 by the compressed air and discharges the liquid from the inside of the sample probe 111b and the reagent probe 120, and thereby the leftover water on the outer wall surface of the sample probe 111b and the reagent probe 120 can be removed without necessitating the compressed air volume of the degree of blowing the leftover water. Therefore, such event can be positively prevented that the leftover cleaning water is scattered simultaneously with discharging of the compressed air to affect the accuracy of the sample evaluation, and the analysis accuracy can be further improved.

Also, the compressed air outlet 204 is disposed so that the compressed air discharged from the compressed air outlets 204 on both sides is blown to the distal end of the sample probe 111b and the reagent probe 120 at the position where the sample probe 111b and the reagent probe 120 can rotate, thereby such event is prevented that the liquid discharged from the inside of the sample probe 111b and the reagent probe 120 comes around to the outer wall surface of the sample probe 111b and the reagent probe 120 to be left over, and it results in conducting of more reliable analysis. Further, in order to more effectively suppress an event that the liquid comes around to the outer wall surface to be left over, it is preferable to stop the motion of discharging the compressed air after stopping the motion of discharging the liquid from the inside of the reagent probe 120.

Also, as described above, it is not necessary to arrange a suction mechanism that suctions the compressed air discharged to the inside of the cleaning bath, and the compressed air volume of the degree of blowing the leftover water on the outer wall surface of the sample probe 111b and the reagent probe 120 is not necessary, therefore the cleaning bath can be simplified, the number of components can be reduced, the compressed air supply mechanism can be made compact, and the leftover water on the outer wall surface of the sample probe 111b and the reagent probe 120 can be removed with the required minimum compressed air volume.

Further, the controller 118 controls the sample probe 111b, the reagent probe 120, and the compressed air supply mechanism 124 so that the sample probe 111b, the reagent probe 120, or the stirring mechanism 105 are further lowered before rising after cleaning the sample probe 111b, the reagent probe 120, or the stirring mechanism 105 and that the discharge volume of the compressed air is gradually increased during this further lowering, thereby the leftover water 802 and the film 803 left over in the compressed air outlet 204 can be attached to the sample probe 111b, the reagent probe 120, or the stirring mechanism 105 without being guided to the upper opening 201 side and can be guided to the lower opening 202 as it is. Therefore, the leftover water attached by the compressed air and the like at the time of the rising motion thereafter can be removed, and such event can be positively prevented that the cleaning water is scattered to the outside of the cleaning bath 113, 108, 106.

Also, the present invention is not limited to the embodiments described above, and various modifications and applications are possible. The embodiments described above were explained in detail in order to facilitate easy understanding of the present invention, and the present invention is not necessarily limited to one that includes all configurations explained.

For example, it is not necessary to discharge the compressed air at every cycle, and whether or not the compressed air is to be discharged can be changed according to the item to be measured. For example, with respect to an item in which priority is preferably given to cleaning of the reagent probe 120 and the like, the cleaning time is made long without conducting the compressed air discharging motion and the motion for securing the drying range. To the contrary, when an item sensitive to water is to be measured, by conducting the discharging motion of the compressed air, the reliability of the apparatus with respect to the item can be secured. Also, by not conducting discharging of the compressed air in a case of a motion not requiring discharging of the compressed air, the load to the compressed air supply mechanism 124 can be reduced.

Further, although the embodiments described above were shown as a case of providing the compressed air outlet 204 at the position for cleaning the reagent probe 120, the present invention is not limited to it. The effect of the present invention is secured by providing the compressed air outlet 204 within the trajectory 701 of the cleaning water discharged from the cleaning water outlet 203.

Also, cleaning of the reagent probe 120 was shown as an example, the present invention is not limited to it. The effect of the present invention is secured even in the sample probe 111b and the stirring mechanism 105. Particularly, the present invention has a probe shape similarly to the reagent probe 120 and the like, and is preferable to be applied also to cleaning of a stirring mechanism having a probe form which stirs liquid by repeating the suctioning and discharging motion in a state of being immersed in the liquid.

DESCRIPTION OF THE REFERENCE CHARACTERS

10: Reagent bottle
100: Automatic analyzer
101: Reaction disk
102: Reaction vessel
103: Normal cleaning mechanism
104: Spectrophotometer
105: Stirring mechanism
106: Cleaning bath (for a stirring mechanism)
107: First reagent dispensing mechanism
107a: Second reagent dispensing mechanism
108: Cleaning bath (for reagent dispensing mechanisms)
109: Reagent disk
110: Reagent bottle
111: Sample dispensing mechanism
111a: Sample dispensing mechanism
111b: Sample probe
112: Detergent bottle
113: Cleaning bath (for a sample dispensing mechanism)
115: Sample vessel
116: Sample rack
117: Sample transfer mechanism
118: Controller
120: Reagent probe
121: Reagent syringe
122: Sample syringe
123: Cleaning water supply mechanism (cleaning water supply unit)
124: Compressed air supply mechanism (compressed air supply unit)
180: Cleaning bath
201: Upper opening
202: Lower opening
203: Cleaning water outlet
204: Compressed air outlet
205: Wall
206: Mark
207: Edge
208: Hole
301, 401, 501: Cleaning bath
302, 402, 502: Flow of cleaning water
601: Flow of compressed air
602: Central axis of the compressed air outlet
701: Trajectory of cleaning water
801: Cleaning water
802: Leftover water at the compressed air outlet
803: Water film at the compressed air outlet
901: Inner wall cleaning
902: Outer wall cleaning
1001: Leftover water at the compressed air outlet
1002: Water film at the compressed air outlet

The invention claimed is:

1. An automatic analyzer for conducting component analysis by performing measurement on a reaction liquid that was caused to react chemically in a reaction vessel, the analyzer comprising:
   a probe for suctioning a sample or a reagent and discharging the sample or the reagent into a reaction vessel;
   a cleaning bath in which to clean the probe;
   a cleaning water supply unit for supplying cleaning water to the cleaning bath to clean the probe;
   a compressed air supply unit for supplying compressed air to the cleaning bath; and
   a controller for controlling the probe, the cleaning water supply unit, and the compressed air supply unit,
   wherein the cleaning bath comprises:
   a discharge channel oriented obliquely downward with respect to the probe including an outlet through which the cleaning water is discharged,
   a cleaning water outlet including a channel oriented obliquely downward with respect to the probe and including a wall separating the channel from the discharge channel, the cleaning water outlet dedicated to discharging, into the cleaning bath, the cleaning water supplied from the cleaning water supply unit, and
   a compressed air outlet that is independent of the cleaning water outlet, oriented obliquely downward with respect to the probe inserted in the cleaning bath, dedicated to discharging the compressed air supplied from the compressed air supply unit toward the probe inserted in the cleaning bath,
   wherein the compressed air outlet dedicated to discharging the compressed air is disposed above the cleaning water outlet dedicated to discharging the cleaning water,
   wherein the channel of the cleaning water outlet includes an inlet through which cleaning water flows into from the cleaning water supply unit and an outlet through which the cleaning water flows out of the channel into the cleaning bath, and
   wherein the outlet of the channel of the cleaning water outlet is disposed above the inlet of the channel of the cleaning water.

2. The automatic analyzer of claim 1,
   wherein the cleaning water in the cleaning bath also cleans the compressed air outlet as well as the probe.

3. The automatic analyzer of claim 2, wherein
   the cleaning water outlet is disposed obliquely below the compressed air outlet, and
   wherein the compressed air outlet is cleaned by the cleaning water discharged obliquely upward from the cleaning water outlet.

4. The automatic analyzer of claim 3,
   wherein the cleaning bath includes a side wall disposed above the outlet of the channel of the cleaning water outlet to direct the cleaning water discharged from the cleaning water outlet to the probe.

5. The automatic analyzer of claim 4,
   wherein the side wall includes an edge oriented in a direction parallel to the discharge direction of the cleaning water.

6. The automatic analyzer of claim 4,
   wherein the cleaning bath has a mark on a top surface thereof, the mark indicating the position where the probe is inserted.

7. The automatic analyzer of claim 1,
   wherein the controller controls the compressed air supply unit such that the compressed air is discharged when the probe is being raised after being cleaned.

8. The automatic analyzer of claim 7,
   wherein the controller causes the probe to discharge liquid after the discharge of the compressed air.

9. The automatic analyzer of claim 8,
   wherein the controller controls the compressed air supply unit such that after the controller causes the probe to stop discharging the liquid, the discharge of the compressed air is halted.

10. The automatic analyzer of claim 1,
    wherein the compressed air outlet is disposed such that the compressed air is blown to the distal end of the probe when the probe is placed at a position where the probe can rotate.

11. The automatic analyzer of claim 1,
    wherein the controller controls the probe and the compressed air supply unit such that before the probe is raised after being cleaned, the probe is lowered further, and during the further lowering, the discharge volume of the compressed air is increased gradually.

* * * * *